US012311376B2

(12) United States Patent
Lacey et al.

(10) Patent No.: US 12,311,376 B2
(45) Date of Patent: May 27, 2025

(54) PIPETTE TIP TRAY AND RACK ASSEMBLY

(71) Applicant: CORNING INCORPORATED, Corning, NY (US)

(72) Inventors: William Joseph Lacey, North Andover, MA (US); Paul Kevin Seeto, Clinton, MA (US)

(73) Assignee: CORNING INCORPORATED, Corning, NY (US)

( * ) Notice: Subject to any disclaimer, the term of this patent is extended or adjusted under 35 U.S.C. 154(b) by 957 days.

(21) Appl. No.: 17/294,850

(22) PCT Filed: Nov. 12, 2019

(86) PCT No.: PCT/US2019/060880
§ 371 (c)(1),
(2) Date: May 18, 2021

(87) PCT Pub. No.: WO2020/112344
PCT Pub. Date: Jun. 4, 2020

(65) Prior Publication Data

US 2022/0016634 A1 Jan. 20, 2022

Related U.S. Application Data

(60) Provisional application No. 62/772,269, filed on Nov. 28, 2018.

(51) Int. Cl.
*B01L 9/00* (2006.01)

(52) U.S. Cl.
CPC ......... *B01L 9/543* (2013.01); *B01L 2200/025* (2013.01); *B01L 2300/0832* (2013.01); *B01L 2300/0858* (2013.01)

(58) Field of Classification Search
CPC ............... B01L 9/543; B01L 2200/025; B01L 2300/0832; B01L 2300/0858
See application file for complete search history.

(56) References Cited

U.S. PATENT DOCUMENTS 4,676,377 A 6/1987 Rainin et al.
5,366,088 A 11/1994 Hill et al.
(Continued)

FOREIGN PATENT DOCUMENTS

CN 101228445 A 7/2008
EP 0136126 A2 4/1985
(Continued)

OTHER PUBLICATIONS

"A system solution for small volume liquid handling", Corning DeckWorks Pipet Tips, Corning Incorporated, 2015 pp. 8.
(Continued)

*Primary Examiner* — Jill A Warden
*Assistant Examiner* — Alex Ramirez
(74) *Attorney, Agent, or Firm* — Chandra J. Duncan

(57) ABSTRACT

Various implementations of a pipette tip system are disclosed having a number of innovative features. In one implementation, a pipette tip tray includes a support plate and one or more sleeves extending downward from the bottom of the support plate. The sleeves can be configured to increase the stability of pipette tips stored in the tray. In another implementation, a pipette tip rack includes a rack base having one or more support walls extending underneath a pipette tip tray having downward extending sleeves. The thickness of the sidewalls of the sleeves can be reduced in the area of the support walls so that the support walls can reach the bottom of the support plate. In another implementation, a pipette tip rack includes a cover having a cushioning layer on the bottom of the cover that contacts the top of the pipette tips and stabilizes them during handling and transport.

8 Claims, 5 Drawing Sheets

(56) References Cited

U.S. PATENT DOCUMENTS

| | | | | | |
|---|---|---|---|---|---|
| 5,392,914 | A | | 2/1995 | Lemieux et al. | |
| 5,441,702 | A | | 8/1995 | Lemieux et al. | |
| 5,588,792 | A | | 12/1996 | Tiso | |
| 5,622,676 | A | | 4/1997 | Lind | |
| 5,642,816 | A | | 7/1997 | Kelly et al. | |
| 5,779,984 | A | | 7/1998 | Kelly et al. | |
| 5,882,603 | A | | 3/1999 | Taggart | |
| 6,019,225 | A | | 2/2000 | Kalmakis et al. | |
| 6,221,317 | B1 | * | 4/2001 | Carl | B01L 9/543 211/60.1 |
| 6,286,678 | B1 | | 9/2001 | Petrek | |
| 7,220,590 | B2 | | 5/2007 | Moritz et al. | |
| 7,267,801 | B2 | | 9/2007 | Hitch et al. | |
| 7,906,075 | B2 | | 3/2011 | Makoto | |
| 8,470,265 | B2 | * | 6/2013 | Motadel | B65D 85/00 422/933 |
| D699,370 | S | | 2/2014 | Motadel et al. | |
| D724,236 | S | | 3/2015 | Motadel et al. | |
| 9,108,201 | B2 | | 8/2015 | Motadel et al. | |
| 2005/0150808 | A1 | | 7/2005 | Sarna et al. | |
| 2013/0323140 | A1 | * | 12/2013 | Motadel | G01N 35/1074 422/524 |
| 2017/0008001 | A1 | | 1/2017 | Motadel et al. | |
| 2017/0297027 | A1 | | 10/2017 | Knight | |

FOREIGN PATENT DOCUMENTS

| | | | | | |
|---|---|---|---|---|---|
| EP | 0339557 | A2 | * | 11/1989 | B01L 9/00 |
| EP | 0669856 | A1 | | 9/1995 | |
| EP | 1110613 | A1 | | 6/2001 | |
| EP | 2623204 | A1 | | 8/2013 | |
| EP | 2771247 | A1 | | 9/2014 | |
| WO | 92/01514 | A1 | | 2/1992 | |
| WO | 95/08392 | A1 | | 3/1995 | |
| WO | 2013/063015 | A1 | | 5/2013 | |
| WO | 2013/181163 | A1 | | 12/2013 | |

OTHER PUBLICATIONS

"Liquid handling Consumables", Elite Pipettes and SureOne Tips, Thermo Fisher Scientific Inc., 2016, pp. 5.

International Search Report and Written Opinion of the International Searching Authority; PCT/US19/60880; Mailed Apr. 1, 2020; 16 Pages; European Patent Office.

Chinese Patent Application No. 201980078630.1, Office Action, dated Apr. 29, 2022, 21 pages (11 pages of English Translation and 10 pages of Original Document), Chinese Patent Office.

* cited by examiner

PIPETTE TIP TRAY AND RACK ASSEMBLY

CROSS-REFERENCE TO RELATED APPLICATION

This is a national stage application under 35 U.S.C. § 371 of International Application No. PCT/US2019/060880, filed Nov. 12, 2019, which claims the benefit of priority under 35 U.S.C. § 120 of U.S. Provisional Application Ser. No. 62/772,269 filed on Nov. 28, 2018, the content of which is relied upon and incorporated herein by reference in its entirety.

TECHNICAL FIELD

This relates to pipette tip trays and/or pipette tip rack assemblies used in connection with liquid handling and dispensing systems.

BACKGROUND

Liquid handling and dispensing systems use pipette tips to accurately and reproducibly handle a range of liquid volumes. The pipette tips can be used for a variety of purposes such as processing samples, adding reagents to samples, and the like. Liquid handling and dispensing systems are used in a variety of industries and facilities including, for example, medical laboratories, research facilities, and the like.

Pipette tips have an opening at one end that is configured to be coupled to a dispensing device and a smaller hole at the other end through which liquid can be drawn and dispensed. Pipette tips are often placed in a pipette trip rack assembly for shipping, storage, and use. Rack assemblies vary in size with some racks being configured to hold dozens, hundreds, or even a thousand or more pipette tips.

One problem with conventional tray and rack combinations is that the pipette tips can become statically charged due to movement between the pipette tips and the tray or rack assembly during shipping, humidity changes, sterilization processes, and the like. The static charge can cause a number of problems. One problem is that the static charge can interfere with liquid pickup and dispensing operations, especially those involving small liquid volumes. The static charge can also affect the chemical characteristics of solutions due to interactions with charged molecules. This can affect the results of experiments in which these factors are important.

The static charge can cause the pipette tips to become misaligned on the rack assembly. The desired alignment is typically straight up and down and/or perpendicular to the rack face. If the pipette tips are not correctly positioned on the rack assembly, then they can become misaligned on the dispensing device, fall off the dispensing device, or be crushed by the dispensing device. This can lead to situations where the dispensing device is unable to accurately draw and dispense liquid. In some situations, it can even lead to contamination of the pipette tip system and/or corresponding well plate samples. The ultimate result is significant and costly down time.

These problems are especially severe for high density rack assemblies. The pipette tips in such assemblies are generally smaller and more susceptible to misalignment from static charges. They also involve small liquid volumes that are more susceptible to being affected by static charges.

SUMMARY

A pipette tip tray and a pipette tip rack assembly can be used to hold and support one or more pipette tips during shipping, handling, and/or use in a liquid handling and dispensing system. The tray can include a support plate and one or more sleeves extending outward from a surface of the support plate. The sleeves each define a hole configured to receive and support a pipette tip. The sleeves support the pipette tips and prevent them from becoming misaligned.

The rack assembly can include a rack base and a cover. The base is configured to receive and support the tray. The cover can be configured to prevent the pipette tips from moving in the tray and becoming misaligned. This can be accomplished by positioning the cover close to or in contact with the top of the pipette tips when the cover is closed.

The tray and rack assembly can be implemented in various ways to realize one or more of the following potential advantages. One advantage is that the pipette tip tray and rack assembly reduce the generation of static electricity that causes misalignment of the pipette tips and disrupts liquid handling operations. They can do this by being structured in such a way as to reduce or prevent movement of the pipette tips in the rack assembly.

Another advantage is that the sleeves strengthen the tray and rack assembly making it better able to withstand the load placed on it during the process of coupling the pipette tips to the automated dispensing device. Yet another advantage is that the pipette tips are the same height in the tray and rack assembly as convention tip systems so that there is no need to reprogram the automation system to use the new tip system.

Although these advantages apply to any pipette tip tray and rack, they can be especially applicable to high-density pipette tip trays and racks such as those that are configured to hold at least 96 pipette tips.

One innovative aspect of the tray can be implemented by increasing the amount of contact or engagement between the pipette tips and the tray. Increasing the amount of contact can reduce or prevent movement between the pipette tips and the tray. The amount of contact that is sufficient to reduce and/or prevent relative movement of the pipette tips can vary based on the specific design of the pipette tips and the tray and rack assembly.

In one implementation, the tray can include one or more sleeves extending downward from a bottom surface of the support plate. The holes in the sleeves can be shaped to increase the amount of contact with the pipette tips. For example, at least 50% of the total surface area defining the holes can be configured to contact the pipette tip. In some cases, the holes can have a tapered shape that corresponds to the tapered shape of the pipette tips.

Another innovative aspect of the tray can be implemented by reducing the thickness of the sleeves in the area next to upward extending support walls in the base. In this way, the sleeves can contact and prevent movement of the pipette tips while also accommodating the underlying support walls.

One innovative aspect of the rack assembly can be implemented by reducing or eliminating the gap between the bottom of the cover and the pipette tips. This serves to further reduce movement of the pipette tips during shipping, handling, and use. In one implementation, the bottom of the cover can be coated with or include a layer of a cushioning material that contacts the top of the pipette tips and holds them in place.

The systems, methods, and devices of this disclosure each have several innovative aspects, no single one of which is solely responsible for the described desirable attributes. The summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other embodiments are disclosed in association with the accompanying drawings in which.

DETAILED DESCRIPTION

Pipette Tip Rack Assembly

Figure 1:
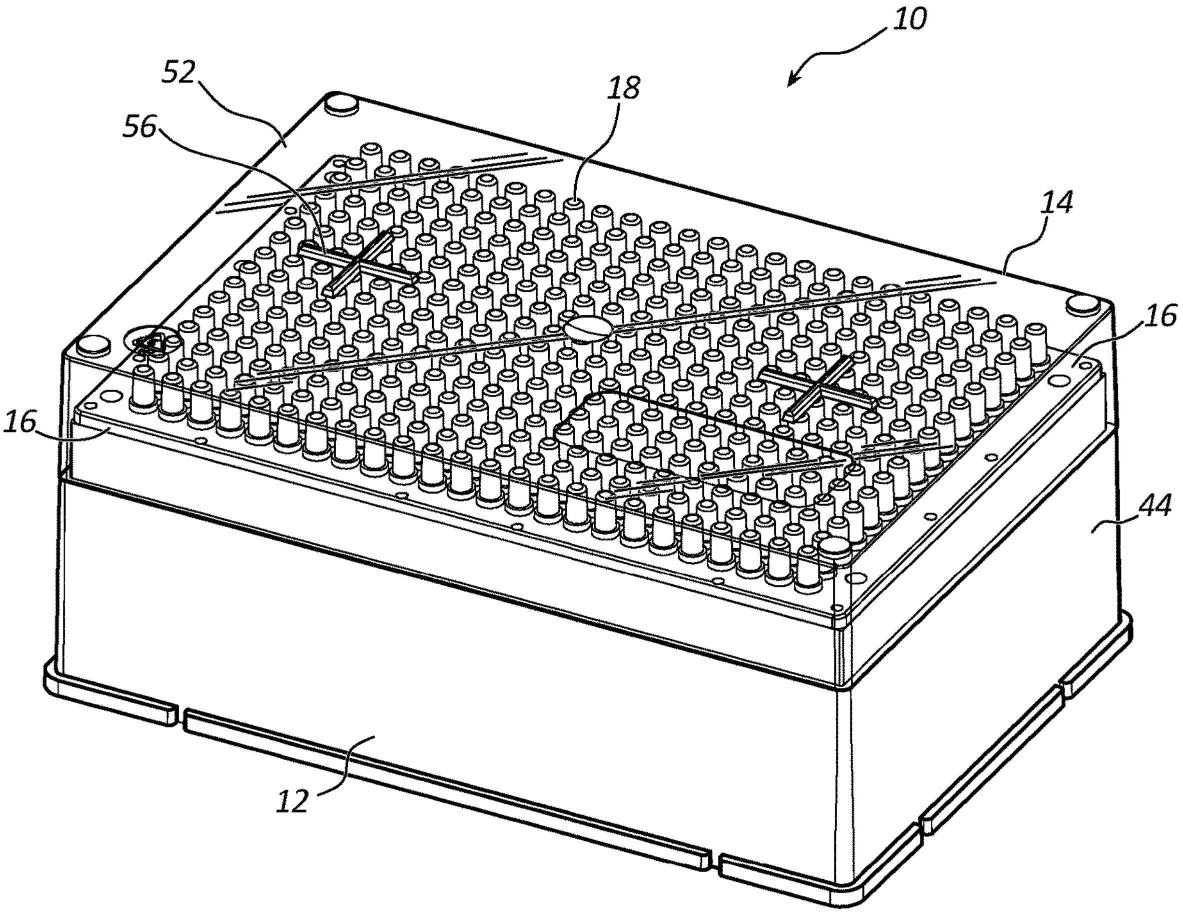
FIG. 1 is a perspective view of a pipette tip rack assembly including a pipette tip tray holding pipette tips in accordance with embodiments of the present disclosure.

FIG. 1 is a perspective view of one implementation of a pipette tip rack assembly 10 (alternatively referred to as a pipette tip rack, pipette tip box, pipette tip assembly) including a rack base 12 (alternatively referred to as a support base or rack support base), a cover 14 (alternatively referred to as a rack cover, lid, or rack lid), and a pipette tip tray 16 (alternatively referred to as a pipette tip insert, pipette tip rack insert, pipette tip plate, pipette tip deck,) supporting pipette tips 18. The base 12 supports the tray 16, and the cover 14 fits over and is coupled to the base 12 to protect and enclose the pipette tips 18.

The rack assembly 10 can be used with any suitable liquid handling and dispensing system such as a manual or automated pipetting system. In general, the rack assembly 10 is used to hold and provide the pipette tips 18 to a dispensing device, which uses the pipette tips 18 to transfer liquid to and from microwell plates (microplates). The combination of the rack assembly 10 and the dispensing device can be referred to as a pipette tip system.

The liquid handling and dispensing system uses the pipette tips 18 to transfer liquid as follows. The pipette tips 18 are coupled to the dispensing device by placing the lower or distal portion of the dispensing device (commonly referred to as the barrel or nozzle) in contact with the top of the pipette tips 18 and applying compressive force.

The dispensing device with the pipette tips 18 attached is moved into contact with the liquid, and a negative pressure is applied to the pipette tips 18 to acquire the liquid. The dispensing device is moved to the dispensing location, and a positive pressure is applied to the pipette tips 18 to dispense the liquid.

This basic procedure can be used to transfer liquid from one location to another. For example, this procedure can be used to transfer liquid from a source to a microplate, from one microplate to another microplate, and the like.

In some implementations, the rack assembly 10 can be used in conjunction with a pipetting head that is part of a manual or automated pipetting system. The pipetting head can be operated using a peristaltic pump system or other suitable system configured to provide negative and positive pressure to the pipette tips 18. The pipetting head can be a multichannel or a single-channel pipetting head. The position and operation of the pipetting head can also be controlled using servo motors or stepper motors. It should be appreciated that the rack assembly 10 can be used with any liquid handling and dispensing system and/or any pipetting head.

The cover 14 moves between an open position where the rack assembly 10 is open and the tray 16 is uncovered and a closed position where the rack assembly 10 is closed and the tray 16 is covered. The cover 14 can be coupled to the base 12 in a variety of ways and allow the cover 14 to move between the open and closed positions. In one implementation, the cover 14 is pivotably coupled to one side of the base 12. The cover 14 rotates between the open position where it is upright and roughly vertical and the closed position where it is down and roughly horizontal.

The rack assembly 10 can have a variety of features depending on a given implementation. For example, in some implementations, the rack assembly 10 can be configured to be disposable or reusable. In some implementations, the rack assembly 10 can be configured to be autoclavable. In some implementations, the rack assembly 10 can be configured to be modular and/or stackable.

It should be appreciated that the components of the rack assembly 10 can be made of any suitable materials. In some implementations, these components can be made of plastic such as polyolefins, for example, polyethylene, polypropylene, and the like. In some other implementations, these components can be made of metal, composites, ceramics, glass, wood, and the like. The components can be made of the same materials or a combination of different materials.

It should be appreciated that numerous changes can be made to the rack assembly 10 shown in FIG. 1. For example, in some implementations, the rack assembly 10 can be provided without the cover 14. The tray 16 can be permanently uncovered. In other implementations, the rack assembly 10 can be a different size. For example, the rack assembly 10 can be configured to hold more or fewer pipette tips 18, can be configured to be shorter or taller, and the like.

Pipette Tip Tray

Figure 2:
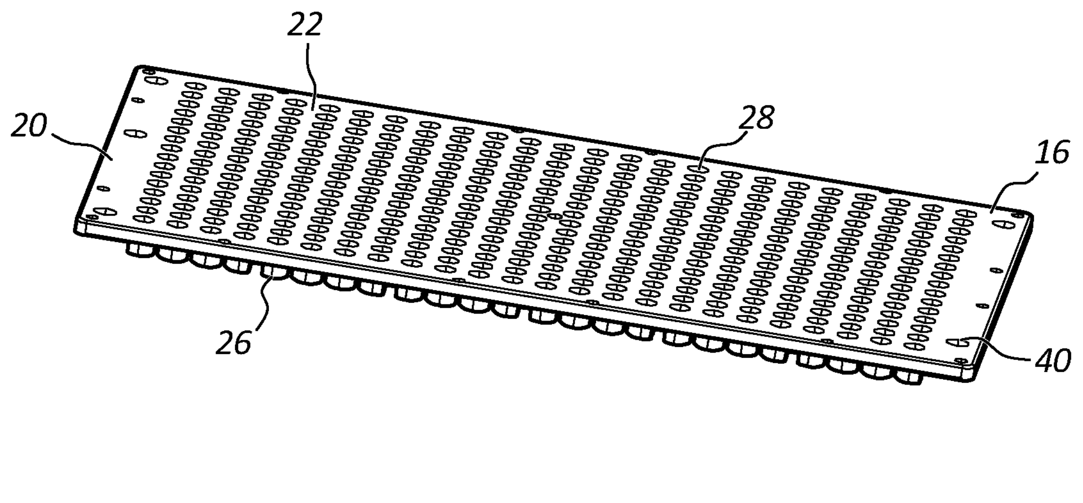
FIG. 2 is a top perspective view of the tray in FIG. 1 in accordance with embodiments of the present disclosure.
Figure 3:
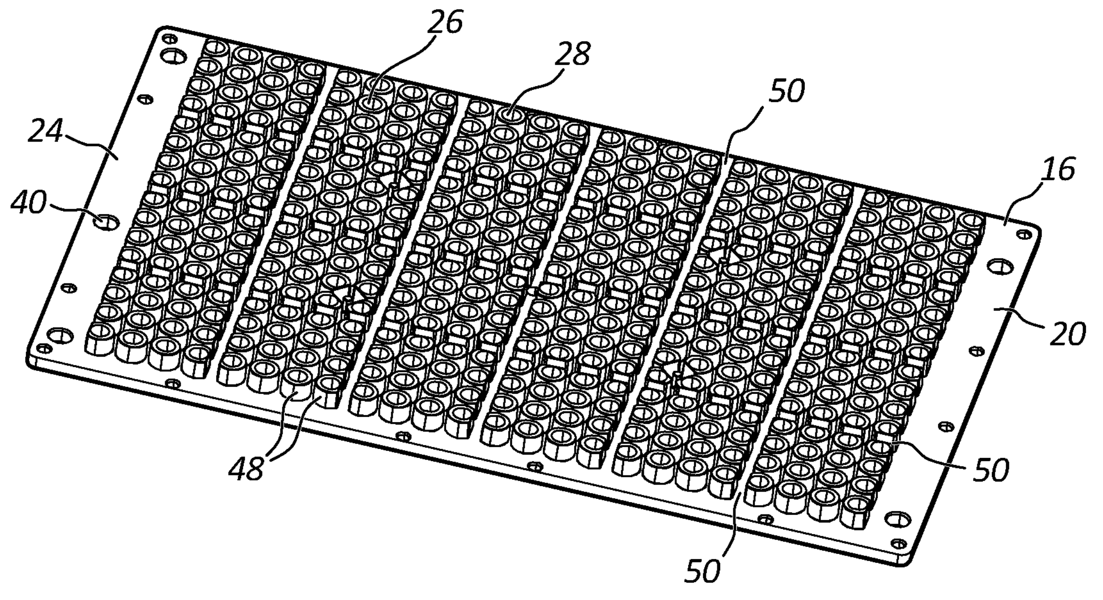
FIG. 3 is a bottom perspective view of the tray in FIG. 1 in accordance with embodiments of the present disclosure.

FIGS. 2-3 are top and bottom perspective views of the pipette tip tray 16 in FIG. 1. The tray 16 includes a support plate 20 (alternatively referred to as a tray face) having a top surface 22 and a bottom surface 24 and sleeves 26 (alternatively referred to as cylinders) extending downward from the bottom surface 24.

The tray 16 shown in FIGS. 2-3 is configured to hold 384 pipette tips 18. It should be appreciated, however, that the tray 16 can be configured to hold more or fewer pipette tips 18. The number of pipette tips 18 the tray 16 is configured to hold can range from one to thousands. In some implementations, the tray 16 can be considered a high-density pipette tip tray, which is a term used to refer to trays having at least 96 pipette tips 18.

The following are some examples of suitable configurations for the tray 16. In some implementations, the tray 16 is configured to hold at least 48 pipette tips, at least 96 pipette tips, at least 192 pipette tips, at least 384 pipette tips, at least 768 pipette tips, or at least 1536 pipette tips. In some implementations, the tray 16 is configured to hold 48 to 1536 pipette tips or 96 to 384 pipette tips.

The tray 16 includes holes 28 (alternatively referred to as bores or tray holes), which are configured to receive and support or hold the pipette tips 18. Conceptually, each hole 28 can be viewed as the combination of separate, concentric holes 30, 32 (FIG. 5) through the support plate 20 and the sleeve 26, respectively.

The hole 30 through the support plate 20 can be referred to as a plate hole 30, and the hole 32 through the sleeve 26 can be referred to as a sleeve hole 32. Also, it should be appreciated that any description of the hole 28 in the tray 16 can apply equally and separately to each hole 30, 32 in the support plate 20 and the sleeve 26, respectively. This means, for example, that a description of the hole 28 as being tapered applies equally and separately to the hole 30 in the support plate 20 and the hole 32 in the sleeve 26.

Figure 4:
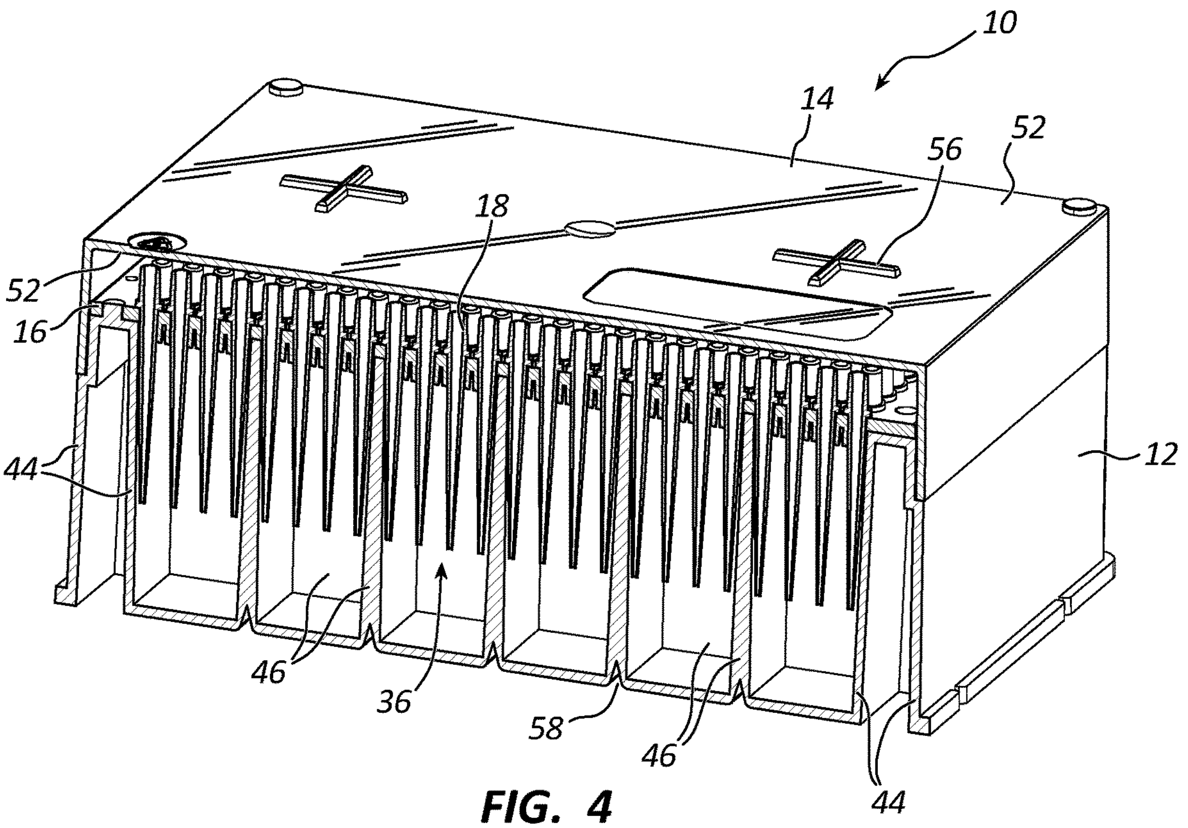
FIG. 4 is a cross-sectional, perspective view of the rack assembly in FIG. 1 showing the tray supported by support walls extending upward from the rack base in accordance with embodiments of the present disclosure.
Figure 5:
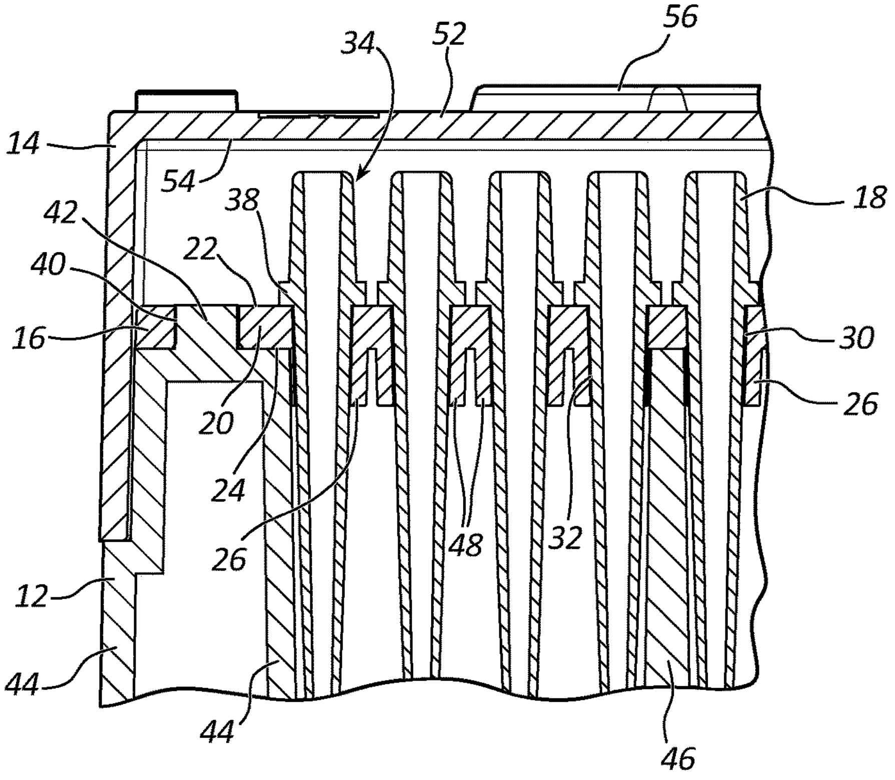
FIG. 5 is a cross-sectional view of the rack assembly in FIG. 1 showing the pipette tips in the tray in accordance with embodiments of the present disclosure.
Figure 6:
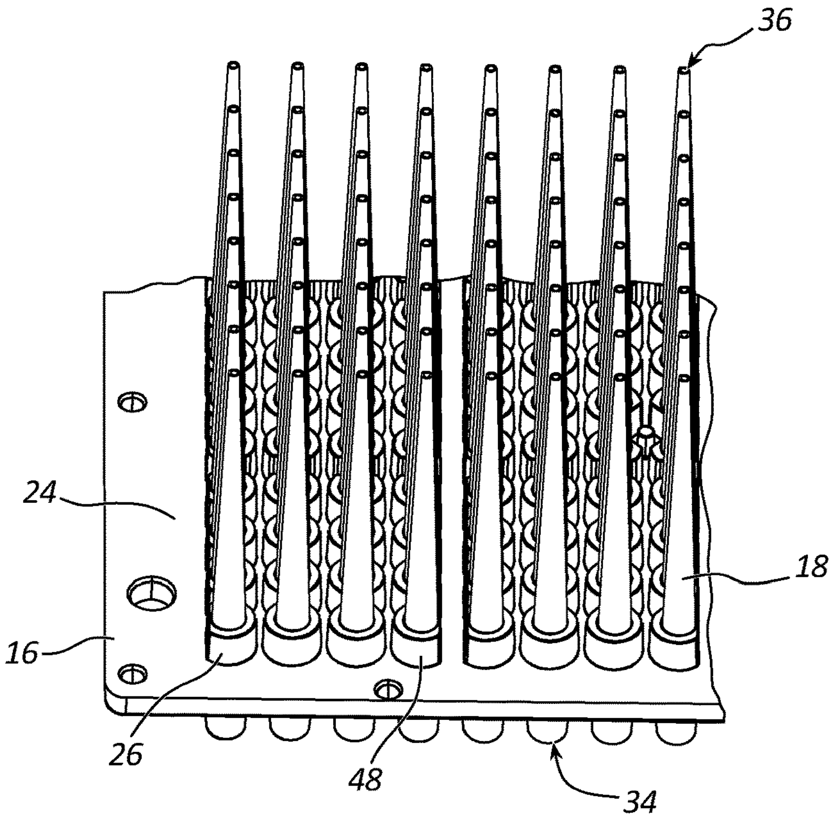
FIG. 6 is a bottom perspective view of the pipette tip tray in FIG. 2 holding pipette tips in accordance with embodiments of the present disclosure.

The pipette tips 18 fit in the holes 28 in the manner shown in FIGS. 4-5, which are cross-sectional views of the rack assembly 10. Each pipette tip 18 has an elongated, tapered shape and includes a top 34 (alternatively referred to as a top portion or top end), a bottom 36 (alternatively referred to as a bottom portion or bottom end), and a flange portion 38 (alternatively referred to as a flange or enlarged portion).

The hole 28 in the tray 16 is sized to receive the bottom 36 of the pipette tip 18. The pipette tip 18 can be inserted into the hole 28 until the flange portion 38 reaches the top surface 22 of the support plate 20. The flange portion 38 is larger than the hole 28 and prevents further movement of the pipette tip 18 through the hole 28. The pipette tip 18 is supported on the top surface 22 of the support plate 20 by the flange portion 38.

Referring back to FIGS. 2-3, the holes 28 are uniformly spaced apart from each other on the support plate 20. Likewise, the pipette tips 18 are also uniformly spaced apart from each other on the tray 16 as shown in FIGS. 4-5. Spacing the pipette tips 18 in this manner makes it easier to couple them to the dispensing device compared to unevenly spaced pipette tips 18. It should be appreciated, however, that the pipette tips 18 can be spaced apart in any suitable fashion whether it be evenly or unevenly.

The holes 28 in the tray 16 have a tapered, annular shape such as the truncated cone shape shown in FIG. 5. The pipette tips 18 can also have a corresponding tapered, annular shape that fits inside the holes 28. The holes 28 and the pipette tips 18 are configured so that the entire interior surface of the holes 28 contacts the exterior surface of the pipette tips 18 in the manner shown in FIG. 5. The amount of contact between the one or more surfaces defining the holes 28 and the exterior surface of the pipette tips 18 helps prevent the pipette tips 18 from moving and generating static charges and/or keeps the pipette tips 18 in a true perpendicular position relative to the tray 16.

It should be appreciated that the holes 28 and the pipette tips 18 can have any suitable shape and/or amount of contact with each other as long as it is sufficient to prevent undue movement of the pipette tips 18 and the resulting undesirable static charges. The following are some examples of alternative configurations of the holes 28 and the pipette tips 18. It should be appreciated that those configurations that produce a significant amount of contact between the holes 28 and pipette tips 18 are typically preferred—e.g., the length of the holes 28 is 1.5 to 2.0 times the diameter.

In some implementations, at least a portion of the holes 28 and the pipette tips 18 have corresponding cross-sectional shapes, or, in other words, matching or at least substantially matching cross-sectional shapes. For example, both the holes 28 (or the one or more surfaces that define the holes 28) and the pipette tips 18 can be: cylindrical, polygonal (triangular, rectangular, square, pentagonal, hexagonal, octagonal, and the like), oblong, irregular shaped, and the like. The holes 28 and the pipette tips 18 can also have different cross-sectional shapes.

The shape of the holes 28 and the pipette tips 18 can be the same over the length of the holes 28 or they can vary. For example, in some implementations, the holes 28 and the pipette tips 18 can be larger near the top of the holes 28 and taper downward to the bottom of the holes 28. In other implementations, the holes 28 and the pipette tips 18 can be the same size at the top and the bottom. In other implementations, the holes 28 and the pipette tips 18 can have the same shape for at least 50% of the length of the holes 28, at least 75% of the length of the holes 28, at least 90% of the length of the holes 28, or at least 95% of the length of the holes 28.

In some implementations, at least 50% of the total surface area defining each hole 28 (the surface area of one or more interior surfaces forming the boundary of the hole 28) is configured to contact the exterior surface of each pipette tip 18. The amount of the total surface area defining each hole 28 configured to contact the exterior surface of the pipette tip 18 can also be at least 60%, at least 70%, at least 80%, at least 90%, at least 95%, or at least 98%.

In some implementations, the length of the hole 28 can be at least as large as the width of the hole 28 where the width is measured at either the top or bottom surface 22, 24 of the support plate 20. It should be noted that the width of the hole 28 refers to the largest cross-sectional dimension of the hole 28 at the top or bottom surface 22, 24. If the hole 28 is circular, then the width is the diameter of the hole 28.

The ratio of the length of the hole 28 to the width of the hole 28 measured at the top surface 22 of the support plate 20 in FIG. 5 is approximately 2 (2:1). It should be appreciated, however, that the ratio of the length of the hole 28 to the width of the hole 28 (measured at either surface 22, 24) can vary substantially. In general, larger ratios make the pipette tip 18 more stable and less prone to undesirable movement. In some implementations, the ratio of length/width of each hole 28 is at least 1 (1:1), at least 1.25, at least 1.5, at least 1.75, or at least 1.9. In other implementations, the ratio of length/width of each hole 28 is 1-3, 1.25-2:75, 1.5-2.5, 1.75-2.25, 1.9-2.1, or 2.

The pipette tips 18 can be configured to hold any suitable volume of liquid. In general, the volume of the pipette tips 18 decreases as the density of the tray 16 increases. In some implementations, the volume of the pipette tips 18 can be no more than 200 μl, no more than 100 μl, no more than 50 μl, or no more than 30 μl. As the density of the tray 16 increases, there is a greater need to keep the pipette tips 18 in a true perpendicular position for pipette head pickup.

Support Plate

Referring to FIGS. 2-3, the support plate 20 and the sleeves 26 are described in greater detail. The support plate 20 is depicted in FIGS. 2-3 as a flat or planar, rectangular component supported by the base 12. It should be appreciated, however, that the support plate 20 can have any suitable shape. The support plate 20 can also be made of any suitable material including any of those described above in connection with the rack assembly 10.

Other than the holes 28, the support plate 20 is entirely solid or almost entirely solid. The support plate 20 doesn't include any other holes extending to the open space under the support plate 20. The support plate 20 includes holes 40 and other miscellaneous holes at the edges, but they do not extend through to the open space under the support plate 20. The holes 40 receive corresponding projections 42 extending upward from the base 12 to hold the support plate 20 in place.

It should be appreciated that the support plate 20 can have numerous other configurations. In some implementations, the percentage of the support plate 20 that is solid, excluding the holes 28 for the pipette tips 18, is at least 75%, at least 80%, at least 85%, at least 90%, at least 95%, or at least 98%.

Sleeves

The sleeves 26 include one or more sidewalls 48 extending downward from the bottom surface 24 of the support plate 20. The sleeves 26 define central axes extending vertically and at least approximately parallel to each other. The central axes pass through the center of the holes 32 in the sleeves 26 and the holes 28 in the tray 16.

The sleeves 26 have a cylindrical shaped exterior and a tapered, annular shaped interior (e.g., truncated cone shape) as shown in FIGS. 3-5. The sleeves 26 are also separate, discrete components spaced apart from each other on the bottom surface 24 of the support plate 20.

It should be appreciated, that the sleeves 26 can have numerous other configurations. For example, in some implementations, the sleeves 26 can have interior or exterior surfaces shaped in any of the ways described above in connection with the holes 28 and the pipette tips 18. Likewise, instead of being separate components, the sleeves 26 can be integrally formed together with adjacent sleeves 26 or interconnected with adjacent sleeves 26 by way of ribs or other connecting structures.

The holes 32 extend through the sleeves 26 and form the lower part of the holes 28 extending through the tray 16. The holes 32 can have any of the properties, characteristics, or dimensions of the holes 28 described above. For example, the holes 32 can have a tapered, annular shape such as a truncated cone shape. The holes 32 can also correspond to the shape of the pipette tips 18. The amount of contact between the one or more surfaces defining the holes 32 can be the same as that described above for the holes 28.

The shape of the holes 32 and the pipette tips 18 can be the same over the length of the holes 32 or they can vary. For example, in some implementations, the holes 32 and the pipette tips 18 can be larger near the top of the holes 32 and taper downward to the bottom of the holes 32. In other implementations, the holes 32 and the pipette tips 18 can be the same size at the top and the bottom. In other implementations, the holes 32 and the pipette tips 18 can have the same shape for at least 50% of the length of the holes 32, at least 75% of the length of the holes 32, at least 90% of the length of the holes 32, or at least 95% of the length of the holes 32.

In some implementations, at least 50% of the total surface area defining each hole 32 is configured to contact the exterior surface of each pipette tip 18. The amount of the total surface area defining each hole 32 configured to contact the exterior surface of the pipette tip 18 can also be at least 60%, at least 70%, at least 80%, at least 90%, at least 95%, or at least 98%.

In some implementations, the length of the hole 32 can be at least as large as the width of the hole 32 where the width is measured at the bottom surface 24 of the support plate 20 or, in other words, the top of the hole 32. It should be noted that the width of the hole 32 refers to the largest cross-sectional dimension of the hole 32 at the bottom surface 24. If the hole 32 is circular, then the width is the diameter of the hole 32.

The ratio of the length of the hole 32 to the width of the hole 32 measured at the bottom surface 24 of the support plate 20 in FIG. 5 is approximately 1 (1:1). It should be appreciated, however, that the ratio of the length of the hole 32 to the width of the hole 32 (measured at the bottom surface 24) can vary substantially. In general, larger ratios make the pipette tip 18 more stable and less prone to undesirable movement. In some implementations, the ratio of length/width of each hole 32 is at least 0.5 (1:2), at least 0.75, or at least 0.9. In other implementations, the ratio of length/width of each hole 32 is 0.5-2.5, 0.75-2.25, 1-2.1, or 1.5-2.

It should be noted that the holes 30 through the support plate 20 can have any of the properties, characteristics, or dimensions described for the holes 32. This includes, for example, the shape of the holes 30, the amount of total surface area defining the holes 30 that contacts the pipette tips 18, and the ratio of the length of the holes 32 to the width of the holes 32, although the width of the holes 32 can be measured at either the top or bottom surface 22, 24 of the support plate 20.

Positioning the sleeves 26 on the bottom surface 24 of the support plate 20 provides a number of advantages. One advantage is that it strengthens the tray 16 to withstand the load incurred when the pipette tips 18 are picked up by the dispensing device. The process of attaching the pipette tips 18 to the dispensing device can result in a significant amount of force being placed on the tray 16. The sleeves 26 add additional structural support to the tray 16 and make it more resilient and capable of handling the force.

Another advantage of positioning the sleeves 26 on the bottom surface 24 is that it does not change the height of the pipette tips 18 (the height being the Z axis) relative to the dispensing device. This means the tray 16 can be substituted for a conventional tray and the pipette tips 18 will be the same height. There is no need to reprogram or reconfigure the dispensing device to account for height differences of the pipette tips 18.

It should be appreciated that some implementations of the tray 16 can include sleeves extending upward from the top surface 22 of the support plate 20. The upward extending slaves can have any of the properties, characteristics, or dimensions described above in connection with the sleeves 26. In such implementations, the bottom surface 24 can include the sleeves 26 or can be flat. Although upward sleeves are possible, it is generally less desirable for at least the following reasons.

First, the upward extending sleeves will need to absorb much of the load applied by the automation head as it picks up the pipette tips 18, which can cause the sleeves to deform. Second, assuming the other components of the rack assembly 10 remain the same, the top 34 of the pipette tips 18 will be higher, which means the liquid handling and dispensing system will need to be reprogrammed or otherwise reconfigured to compensate for the change.

Rack Base

Referring to FIGS. 4-5, the rack base 12 can include sidewalls 44 located on the perimeter or sides of the base 12 and support walls 46 (alternatively referred to as ribs or support ribs) extending between the sidewalls 44 underneath the tray 16. The support walls 46 form a grid pattern underneath the tray 16 where one group of support walls 46 is positioned perpendicular to another group of support walls 46.

The support walls 46 extend upward from the bottom of the base 12 and contact the bottom surface 24 of the support plate 20. The support walls 46 provide additional support for the tray 16 so it can withstand the forces associated with picking up the pipette tips 18.

The base 12 shown in FIGS. 3-5 includes three support walls 46 extending in a lengthwise direction of the rack assembly 10 and five support walls 46 extending in a cross-wise direction. It should be appreciated that the base 12 can include more or fewer support walls 46 and the support walls 46 can have different spatial configurations. For example, the support walls 46 can be configured to extend diagonally underneath the tray 16. Also, the support walls 46 can be configured parallel to each other without any perpendicular extending support walls 46. Numerous variations are possible.

The sleeves 26 are modified to allow the support walls 46 to contact the bottom surface 24 of the support plate 20. This is done by truncating one or more sides of the sidewalls 48 of the sleeves 26 in the area adjacent to the support walls 46. As shown in FIG. 3, some of the sleeves 26 are truncated on one side while some of the sleeves 26 are truncated on two sides. The sleeves 26 that are truncated on two sides are adjacent to locations where two perpendicular support walls 46 intersect. The sleeves 26 having truncated sidewalls 48 can be referred to as truncated sleeves.

Although the sidewalls 48 of the truncated sleeves 26 are thinner, they still surround and define the holes 32 in the sleeves 26. Thinning the sidewalls 48 in this manner creates channels 50 between the sleeves 26 that are sized and shaped to receive the support walls 46. The channels 50 are shown in FIG. 3.

As shown in FIG. 3, the channels 50 define square shapes on the bottom surface 24 of the support plate 20 each of which contains sixteen sleeves 26. It should be appreciated that in other implementations the channels 50 can define any polygonal shape on the bottom surface 24 containing any number of the sleeves 26. For example, the channels 50 can define a polygonal shape containing 8-32 of the sleeves 26.

It should also be appreciated that numerous modifications can be made to way the support walls 46 support the tray 16. For example, in some implementations, the sidewalls 48 of the sleeves 26 can be completely removed in the area adjacent to the support walls 46. In these implementations, the holes 32 can be left open in those areas or the support walls 46 can be configured to define the missing portion of the holes 32.

Cover

Referring to FIGS. 1 and 4-5, the cover 14 includes a top 52 and a bottom 54. The top 52 includes upward extending projections 56 configured to be received by corresponding recesses 58 in the bottom of the base 12. The projections 56 and the recesses 58 make it possible to stack multiple rack assemblies 10 on top of each other in a stable fashion.

Figure 7:
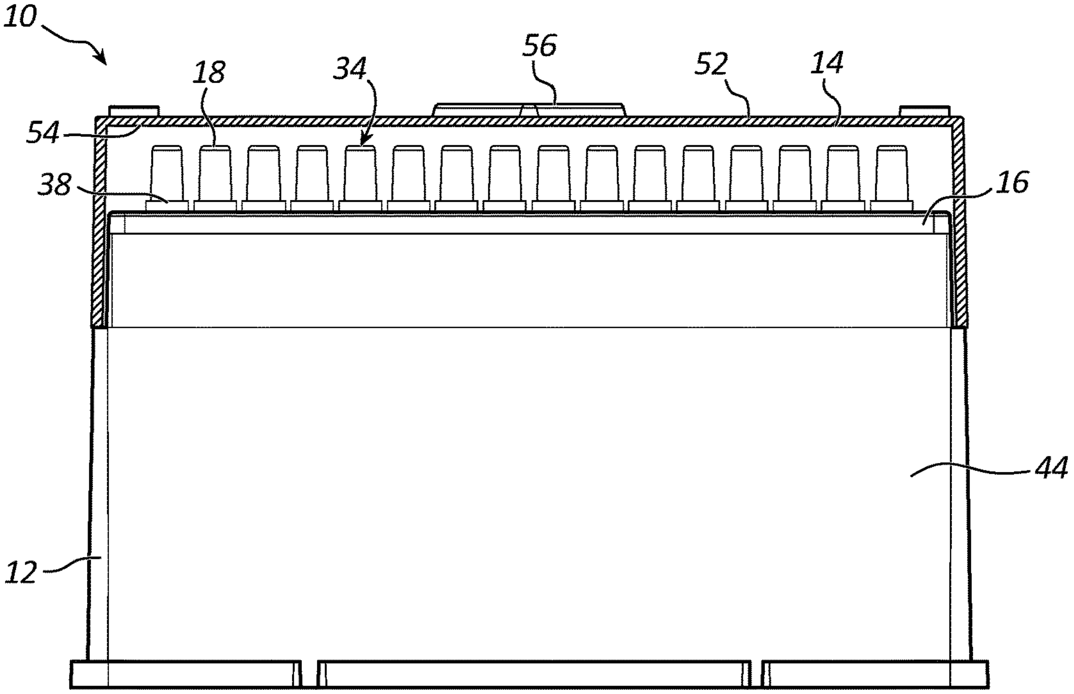
FIG. 7 is a front view of one implementation of the rack assembly in FIG. 1 having a gap between the bottom of the cover and the tops of the pipette tips in accordance with embodiments of the present disclosure.

FIG. 7 is a front view of one implementation of the rack assembly 10 having a gap between the bottom 54 of the cover 14 and the tops 34 of the pipette tips 18. The size of the gap can be reduced to further reduce movement of the pipette tips 18 during shipping, handling, and use. For example, in some implementations, the distance between the bottom 54 and the tops 34 of the pipette tips 18 can be no more than 50 mils (aprx. 1.25 mm), no more than 40 mils (aprx. 1 mm), no more than 35 mils (apprx. 0.9 mm), or no more than 30 mils (apprx. 0.75 mm). In other implementations, the distance between the bottom 54 and the tops 34 of the pipette tips 18 can be 5-45 mils, 10-40 mils, 15-35 mils, or 20-30 mils.

Figure 8:
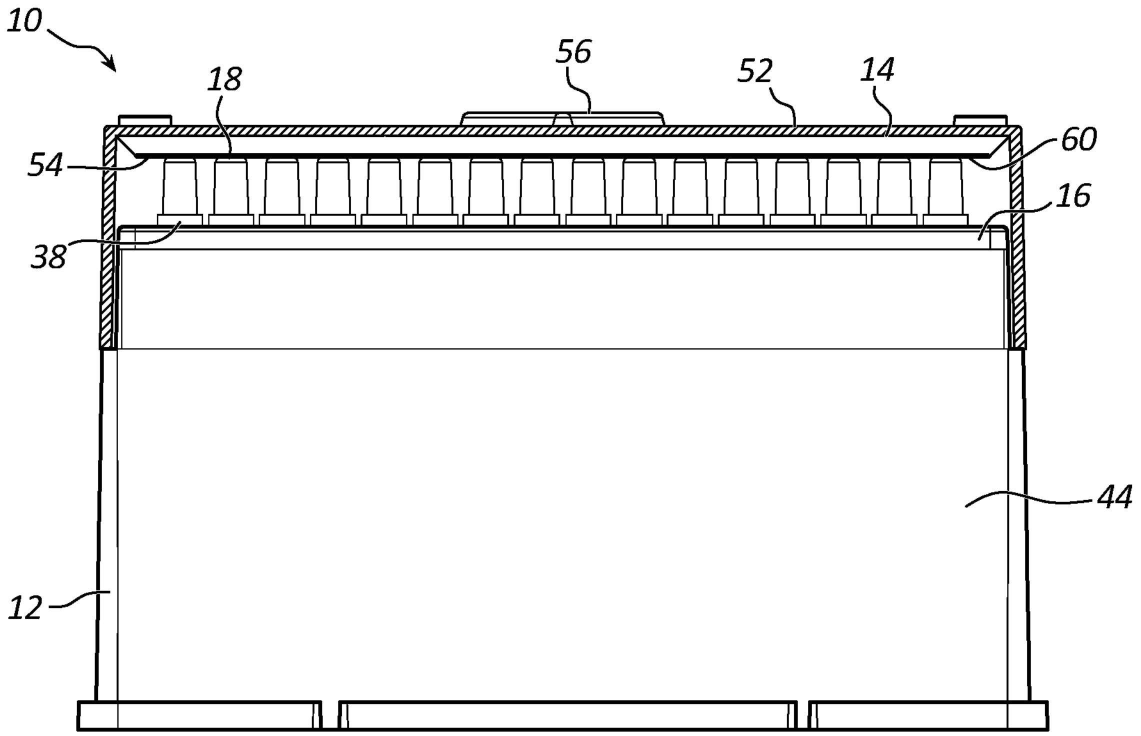
FIG. 8 is a front view of another implementation of the rack assembly in FIG. 1 having a cushioning layer on the bottom of the cover that contacts the tops of the pipette tips in accordance with embodiments of the present disclosure.

FIG. 8 is a front view of another implementation of the rack assembly 10 having a cushioning layer 60 (alternatively referred to as a cushioning film) on the bottom 54 of the cover 14 that contacts the tops 34 of the pipette tips 18. The cushioning layer 60 biases the pipette tips 18 against the top of the tray 16. This helps to further reduce and/or prevent movement of the pipette tips 18 during shipping, handling, and use.

The cushioning layer 60 is softer than the material to which it is applied, which is typically the material used to make the rest of the cover 14. In some implementations, the cushioning layer 60 can be at least 50% softer, at least 100% softer, or at least 150% softer than the substrate to which it is applied (alternatively referred to as a support layer or structural layer). The softness of the cushioning layer 60 and the substrate can be measured using an appropriate hardness scale such as the Rockwell hardness scale or the Shore hardness scale.

The cushioning layer 60 can be any suitable thickness and can be made of any suitable material. In some implementations the cushioning layer 60 is 5-50 mils (127-1270 microns) thick, 7-30 mils (178-762 microns) thick, or 10-20 mils (254-508 microns) thick. In some implementations, the cushioning layer 60 can be a polymer material such as a polyester material. In some implementations, the cushioning layer 60 can be made of a non-conductive or electrically insulating material. In some implementations, the cushioning layer 60 can hold a negative charge to help reduce static charges produced by transporting the pipette tips 18.

Illustrative Implementations

The following is a description of various implementations of the disclosed subject matter. Each implementation may include one or more of the various features, characteristics, or advantages of the disclosed subject matter. The implementations are intended to illustrate a few aspects of the disclosed subject matter and should not be considered a comprehensive or exhaustive description of all possible implementations.

P1. A pipette tip tray comprising: a support plate; and a sleeve extending downward from a bottom surface of the support plate; wherein the sleeve defines a hole configured to receive and support a pipette tip; and wherein the hole has a tapered shape.

P2. The pipette tip tray of paragraph P1 wherein the hole has a conical shape.

P3. The pipette tip tray of any one of paragraphs P1-P2 wherein the sleeve has an annular shape.

P4. The pipette tip tray of any one of paragraphs P1-P3 wherein the hole has a tapered annular shape.

P5. The pipette tip tray of any one of paragraphs P1-P4 wherein the sleeve includes one or more interior surfaces defining the hole, and wherein at least 50% of the total surface area of the one or more interior surfaces is configured to contact the pipette tip.

P6. The pipette tip tray of any one of paragraphs P1-P5 comprising a hole extending through the pipette tip tray and including the hole in the sleeve, wherein a ratio of the length of the hole through the pipette tip tray to the width (e.g., diameter) of the hole at the bottom surface of the support plate is at least 1.

P7. The pipette tip tray of any one of paragraphs P1-P6 wherein a ratio of the length of the hole through the pipette tip tray to the width (e.g., diameter) of the hole at the bottom surface of the support plate is at least 1.5.

P8. The pipette tip tray of any one of paragraphs P1-P7 wherein the hole is a sleeve hole, the pipette tray comprising a tray hole extending through the tray and including the sleeve hole, wherein the tray hole has a tapered shape.

P9. The pipette tip tray of paragraph P8 wherein the tray hole has a conical shape.

P10. The pipette tip tray of any one of paragraphs P8-P9 wherein a ratio of the length of the tray hole to the width (e.g., diameter) of the tray hole at the bottom surface of the support plate is at least 1.

P11. The pipette tip tray of any one of paragraphs P8-P10 wherein a ratio of the length of the tray hole to the width (e.g., diameter) of the tray hole at the bottom surface of the support plate is at least 1.5.

P12. The pipette tip tray of any one of paragraphs P1-P11 comprising at least 48 sleeves.

P13. The pipette tip tray of any one of paragraphs P1-P12 comprising at least two of the sleeves, wherein each of the sleeves includes a central axis extending through the center of the hole, and wherein the central axes of the holes are parallel to each other.

P14. The pipette tip tray of any one of paragraphs P1-P13 comprising the pipette tip positioned in the hole, wherein the shape of the hole and the shape of the pipette tip correspond to each other.

P15. The pipette tip tray of any one of paragraphs P1-P14 comprising the pipette tip positioned in the hole, wherein the sleeve includes one or more interior surfaces defining the hole, and wherein at least 50% of the total surface area of the one or more interior surfaces contacts the pipette tip.

P16. The pipette tip tray of any one of paragraphs P1-P15 comprising the pipette tip positioned in the hole, wherein the hole and pipette tip have corresponding conical shapes.

P17. A pipette tip tray comprising: a support plate; and a sleeve extending downward from a bottom surface of the support plate; wherein the sleeve includes one or more surfaces defining a hole configured to receive and support a pipette tip; and wherein at least 50% of the total surface area of the one or more interior surfaces is configured to contact the pipette tip.

P18. The pipette tip tray of paragraph P17 wherein the hole has a conical shape.

P19. The pipette tip tray of any one of paragraphs P17-P18 wherein the sleeve has an annular shape.

P20. The pipette tip tray of any one of paragraphs P17-P19 wherein the hole has a tapered annular shape.

P21. The pipette tip tray of any one of paragraphs P17-P20 comprising a hole extending through the pipette tip tray and including the hole in the sleeve, wherein a ratio of the length of the hole through the pipette tip tray to the width (e.g., diameter) of the hole at the bottom surface of the support plate is at least 1.

P22. The pipette tip tray of any one of paragraphs P17-P21 wherein a ratio of the length of the hole through the pipette tip tray to the width (e.g., diameter) of the hole at the bottom surface of the support plate is at least 1.5.

P23. The pipette tip tray of any one of paragraphs P17-P22 wherein the hole is a sleeve hole, the pipette tray comprising a tray hole extending through the tray and including the sleeve hole, wherein the tray hole has a tapered shape.

P24. The pipette tip tray of paragraph P23 wherein the tray hole has a conical shape.

P25. The pipette tip tray of any one of paragraphs P23-P24 wherein a ratio of the length of the tray hole to the width (e.g., diameter) of the tray hole at the bottom surface of the support plate is at least 1.

P26. The pipette tip tray of any one of paragraphs P23-P25 wherein a ratio of the length of the tray hole to the width (e.g., diameter) of the tray hole at the bottom surface of the support plate is at least 1.5.

P27. The pipette tip tray of any one of paragraphs P17-P26 comprising at least 48 sleeves.

P28. The pipette tip tray of any one of paragraphs P17-P27 comprising at least two of the sleeves, wherein each of the sleeves includes a central axis extending through the center of the hole, and wherein the central axes of the holes are parallel to each other.

P29. The pipette tip tray of any one of paragraphs P17-P28 comprising the pipette tip positioned in the hole, wherein the shape of the hole and the shape of the pipette tip correspond to each other.

P30. The pipette tip tray of any one of paragraphs P17-P29 comprising the pipette tip positioned in the hole, wherein the sleeve includes one or more interior surfaces defining the hole, and wherein at least 50% of the total surface area of the one or more interior surfaces contacts the pipette tip.

P31. The pipette tip tray of any one of paragraphs P17-P30 comprising the pipette tip positioned in the hole, wherein the hole and pipette tip have corresponding conical shapes.

P32. A pipette tip rack assembly comprising: a rack base including a support wall; and a pipette tip tray positioned on and supported by the rack base, the pipette tip tray including a sleeve extending downward and defining a hole configured to receive and support a pipette tip; wherein the support wall contacts the underside of the pipette tip tray; and wherein the thickness of the sleeve next to the support wall is reduced compared to the thickness of the sleeve that is not next to the support wall.

P33. The pipette tip rack assembly of paragraph P32 wherein the sleeve is a truncated sleeve, the pipette tip tray comprising at least 48 sleeves, which include the truncated sleeve, and wherein the holes defined by the 48 sleeves are uniformly spaced apart from each other on the pipette tip tray.

P34. The pipette tip rack assembly of any one of paragraphs P32-P33 wherein the rack base includes opposing sidewalls and the support wall extends from one of the opposing sidewalls to the other one of the opposing sidewalls.

P35. The pipette tip rack assembly of any one of paragraphs P32-P34 wherein the rack base includes at least two support walls contacting the underside of the pipette tip tray.

P36. The pipette tip rack assembly of paragraph P35 wherein the at least two support walls are positioned perpendicular to each other.

P37. The pipette tip rack assembly of any one of paragraphs P32-P36 wherein the pipette tip tray is any one of the pipette tip trays recited in paragraphs P1-P31.

P38. A pipette tip rack assembly comprising: a rack base; a pipette tip tray positioned on and supported by the rack base, the pipette tip tray including a hole; a pipette tip positioned in the hole in the pipette tip tray; and a cover coupled to the rack base, the cover being movable between an open position and a closed position; wherein the bottom of the cover includes a cushioning layer; and wherein the top of the pipette tip contacts the cushioning layer on the bottom of the cover.

P39. The pipette tip rack assembly of paragraph P38 wherein the cushioning layer is coupled to a structural layer, and wherein the cushioning layer is softer than the structural layer.

P40. The pipette tip rack assembly of any one of paragraphs P38-P39 wherein the cushioning layer is non-conductive.

P41. The pipette tip rack assembly of any one of paragraphs P38-P40 wherein the cushioning layer includes polyester.

P42. The pipette tip rack assembly of any one of paragraphs P38-P41 wherein the cushioning layer is approximately 5 mils (127 microns) to approximately 50 mils (1270 microns) thick.

P43. The pipette tip rack assembly of any one of paragraphs P38-P42 wherein the cushioning layer is approximately 7 mils (178 microns) to approximately 30 mils (762 microns) thick.

P44. The pipette tip rack assembly of any one of paragraphs P38-P43 wherein the cushioning layer is approximately 10 mils (254 microns) to approximately 20 mils (508 microns) thick.

P45. The pipette tip rack assembly of any one of paragraphs P38-P44 wherein the pipette tip tray is any one of the pipette tip trays recited in paragraphs P1-P31.

P46. The pipette tip rack assembly of any one of paragraphs P38-P45 wherein the rack base is any one of the rack bases recited in paragraphs P32-P37.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative implementations where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any implementation, feature, or combination of features described or illustrated in this document. This is true even if only a single implementation of the feature or combination of features is illustrated and described.

Joining or Fastening Terminology and Interpretative Conventions

The term “coupled” means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term “coupled” includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, and the like can be permanent, readily releasable, or difficult to release depending on the application.

Drawing Related Terminology and Interpretative Conventions

The drawings are intended to illustrate implementations that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

Spatial or directional terms, such as “left,” “right,” “front,” “back,” and the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

The invention claimed is:

1. A pipette tip rack assembly comprising:

a rack base including a support wall; and a pipette tip tray positioned on and supported by the rack base, the pipette tip tray including a first sleeve and a second sleeve, wherein each sleeve extends downward and defines a hole configured to receive and support a pipette tip;

wherein the support wall contacts the underside of the pipette tip tray;

wherein the first sleeve has a sidewall that is adjacent to the support wall and no sidewall of the second sleeve is adjacent to the support wall; and wherein the sidewall of the first sleeve is thinner than any sidewall of the second sleeve.

2. The pipette tip rack assembly of claim 1, wherein the pipette tip tray comprises at least 48 sleeves, and wherein the holes defined by the sleeves are uniformly spaced apart from each other on the pipette tip tray.

3. The pipette tip rack assembly of claim 1, wherein the rack base includes opposing sidewalls and the support wall extends from one of the opposing sidewalls to the other one of the opposing sidewalls.

4. The pipette tip rack assembly of claim 1, wherein the rack base includes at least two support walls contacting the underside of the pipette tip tray, and wherein the at least two support walls are positioned perpendicular to each other.

5. A pipette tip rack assembly comprising:

a rack base including a support wall;

a pipette tip tray positioned on and supported by the rack base, the pipette tip tray including a first sleeve and a second sleeve, wherein each sleeve extends downward and defines a hole configured to receive and support a pipette tip;

a pipette tip positioned in the hole in the pipette tip tray; and a cover coupled to the rack base, the cover being movable between an open position and a closed position;

wherein the bottom of the cover includes a cushioning layer;

wherein the cushioning layer on the bottom of the cover contacts the top of the pipette tip;

wherein the support wall contacts the underside of the pipette tip tray;

wherein the first sleeve has a sidewall that is adjacent to the support wall and no sidewall of the second sleeve is adjacent to the support wall; and wherein the sidewall of the first sleeve is thinner than any sidewall of the second sleeve.

6. The pipette tip rack assembly of claim 5, wherein the cushioning layer is non-conductive.

7. The pipette tip rack assembly of claim 5, wherein the cushioning layer includes polyester.

8. The pipette tip rack assembly of claim 5, wherein the cushioning layer is approximately 5 mils (127 microns) to approximately 50 mils (1270 microns) thick.

* * * * *